G. C. KEPPELER.
FRUIT SQUEEZING TONGS.
APPLICATION FILED SEPT. 12, 1917.
1,305,806. Patented June 3, 1919.
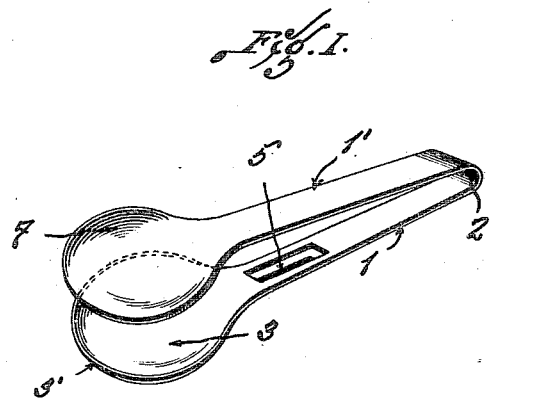
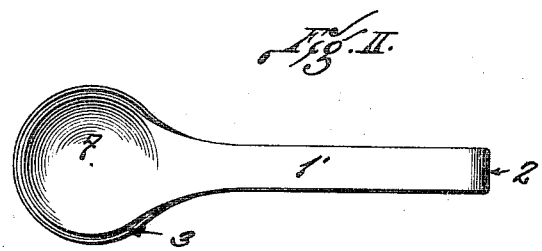
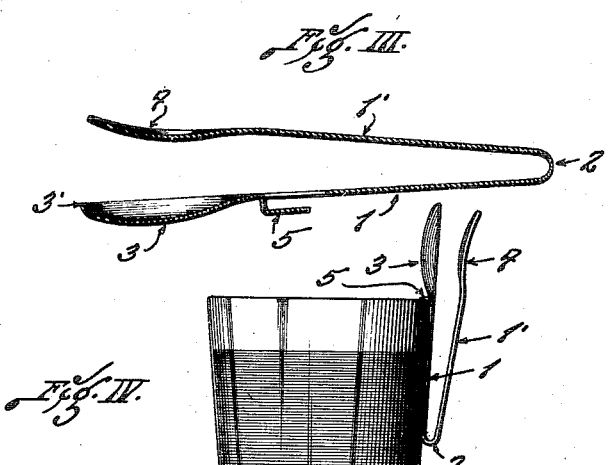
INVENTOR:—
GEORGE C. KEPPELER,
BY
Knight & Cook
ATT'YS.

UNITED STATES PATENT OFFICE.

GEORGE C. KEPPELER, OF WEST BADEN, INDIANA, ASSIGNOR OF ONE-HALF TO THEODORE DIXON, OF WEST BADEN, INDIANA.

FRUIT-SQUEEZING TONGS.

1,305,806.           Specification of Letters Patent.     Patented June 3, 1919.

Application filed September 12, 1917. Serial No. 190,873.

*To all whom it may concern:*

Be it known that I, GEORGE C. KEPPELER, a citizen of the United States of America, a resident of West Baden, county of Orange, and State of Indiana, have invented certain new and useful Improvements in Fruit-Squeezing Tongs, of which the following is a full, clear, and exact description, reference being had to the accompanying drawings, forming a part of this specification.

My invention relates to a simple and inexpensive device for extracting the juice from slices or pieces of lemon or other fruits, the device being intended more particularly for use in squeezing slices of lemon used for iced tea or other beverages.

Figure I is a perspective view of my squeezer.

Fig. II is a top view of the squeezer.

Fig. III is a longitudinal section.

Fig. IV is a view showing the squeezer as it appears when hung upon a tumbler.

In its preferred form my squeezer is made from a single piece of resilient metal, preferably steel, the piece of metal being bent midway of its ends to provide U-shaped spring tongs comprising a pair of arms 1 and 1' joined by a bow 2 serving to normally hold the arms separated from each other. The arm 1 terminates in a dished jaw 3 and the arm 1' terminates in a dished jaw 4, the dishing of the jaws being in the same direction so that when the jaws are moved toward each other the convex side of the jaw 4 will tend to enter into the concavity of the jaw 3. The jaw 3 is formed to provide an abrupt marginal wall 3' extending throughout the sides and front end of the jaw, the purpose of this wall being to form a barrier which will prevent the juice extracted from a piece of fruit being projected laterally during squeezing operation.

One of the arms of my squeezer is provided with a hanger hook 5, by which the squeezer may be hung upon a tumbler or other vessel, said hanger hook being preferably produced by striking a tongue from the arm furnished with a hook and bending this tongue into the desired shape to produce the hanger hook.

I claim:

1. A fruit squeezer consisting of a single piece of metal bent to form U-shaped tongs having a spring bow, the arms of said tongs terminating in jaws dished in a corresponding direction so that the convex side of one jaw will enter the concavity of the second jaw.

2. A fruit squeezer consisting of a single piece of metal bent to form U-shaped tongs having a spring bow, the arms of said tongs terminating in jaws dished in a corresponding direction so that the convex side of one jaw will enter the concavity of the second jaw, said second jaw having an abrupt marginal wall serving to prevent lateral projection of extracted juices during squeezing operation.

In testimony that I claim the foregoing I hereunto affix my signature.

GEORGE C. KEPPELER.